United States Patent [19]
Despres

[11] Patent Number: 5,096,341
[45] Date of Patent: * Mar. 17, 1992

[54] HOLE SAW AND DRIVE

[76] Inventor: Roger J. Despres, 9630 El Rey Ave., #13, Fountain Valley, Calif. 92708

[*] Notice: The portion of the term of this patent subsequent to May 3, 2005 has been disclaimed.

[21] Appl. No.: 189,048

[22] Filed: May 2, 1988

Related U.S. Application Data

[63] Continuation-in-part of Ser. No. 855,949, Apr. 25, 1986, Pat. No. 4,741,651.

[51] Int. Cl.$^5$ ............................................. B23B 51/04
[52] U.S. Cl. ...................................... 408/68; 408/209; 408/204; 408/703
[58] Field of Search ............ 408/68, 86, 118, 204–209, 408/142, 710, 139; 192/94, 97, 67 P, 108; 411/7, 911; 125/20; 144/20-23; 29/256; 279/91; 403/320, 22, 118

[56] References Cited

U.S. PATENT DOCUMENTS

| | | | |
|---|---|---|---|
| 137,435 | 4/1878 | Gillespie | 408/59 X |
| 915,201 | 3/1909 | Miller et al. | 408/142 X |
| 3,647,310 | 3/1972 | Morse | 408/209 |
| 4,741,651 | 5/1988 | Despres | 408/204 X |
| 5,035,548 | 7/1991 | Pidgeon | 408/204 X |

Primary Examiner—Larry I. Schwartz
Assistant Examiner—R. Schultz
Attorney, Agent, or Firm—Roy A. Ekstrand

[57] ABSTRACT

A hole saw and drive includes a cup-shaped saw body having a closed end and a plurality of cutting teeth. A left-hand threaded collar is secured to the closed end and defines one or more drive tabs extending into the saw body interior. A left-hand threaded mandrel is received within the threaded collar and includes a pilot drill and intermediate outwardly extending flange. An additional set of one or more drive tabs extend upwardly toward the threaded collar from the flange. The drive tabs cooperate to couple rotational power from the mandrel to the saw body. The left-hand threads on the mandrel and collar cooperate to permit the reverse rotational operation of the mandrel to expel a cutting plug from the saw body interior.

7 Claims, 3 Drawing Sheets

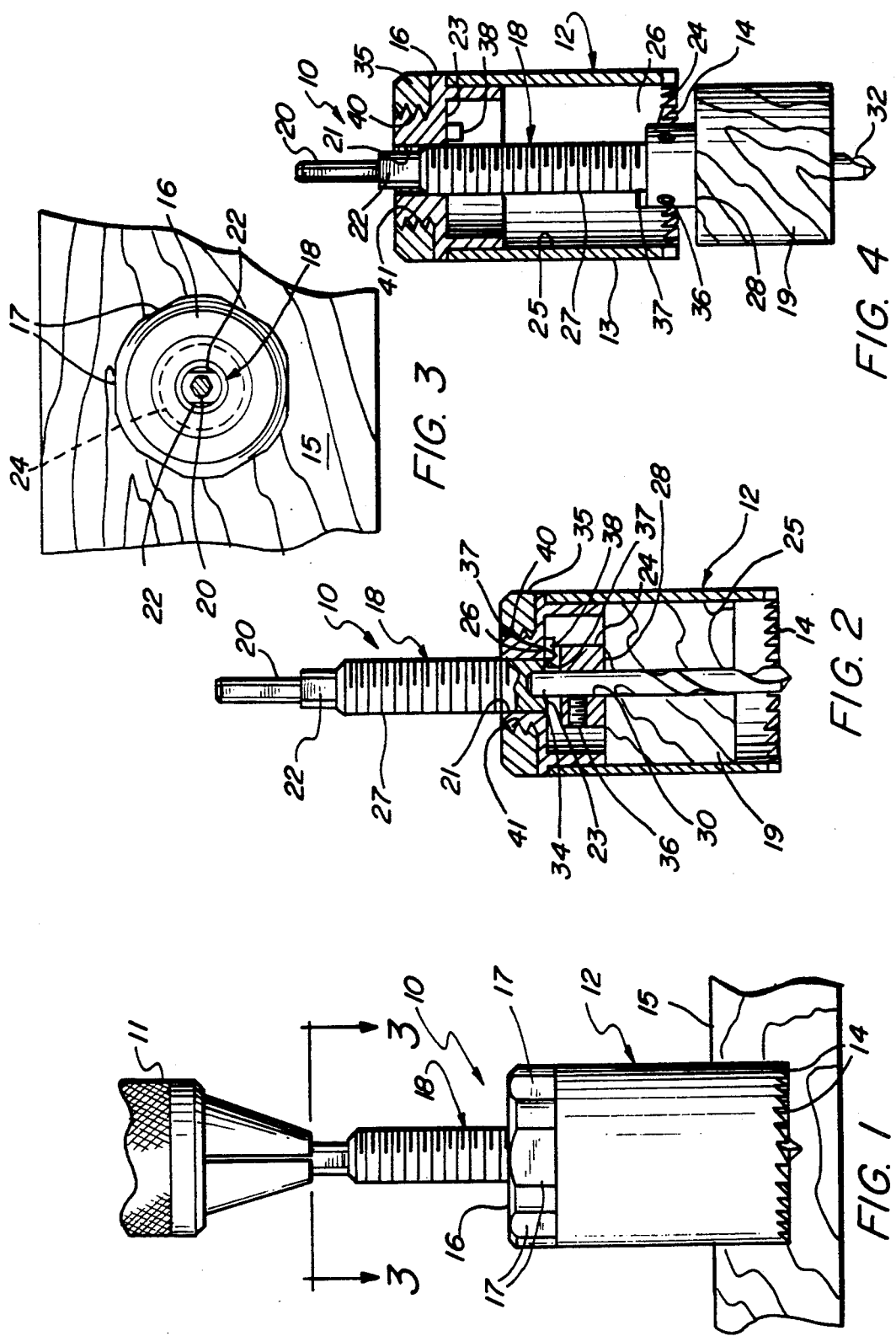

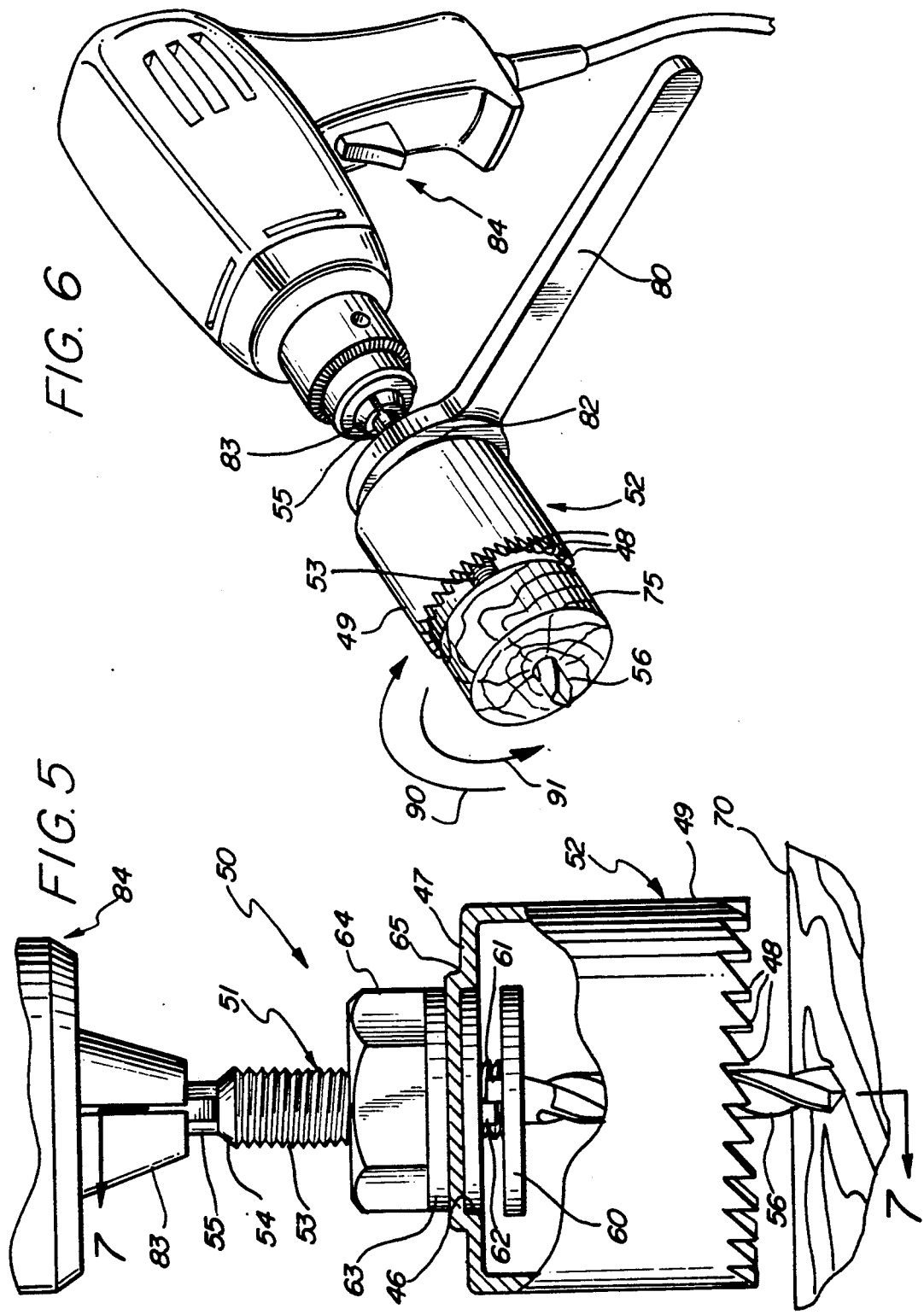

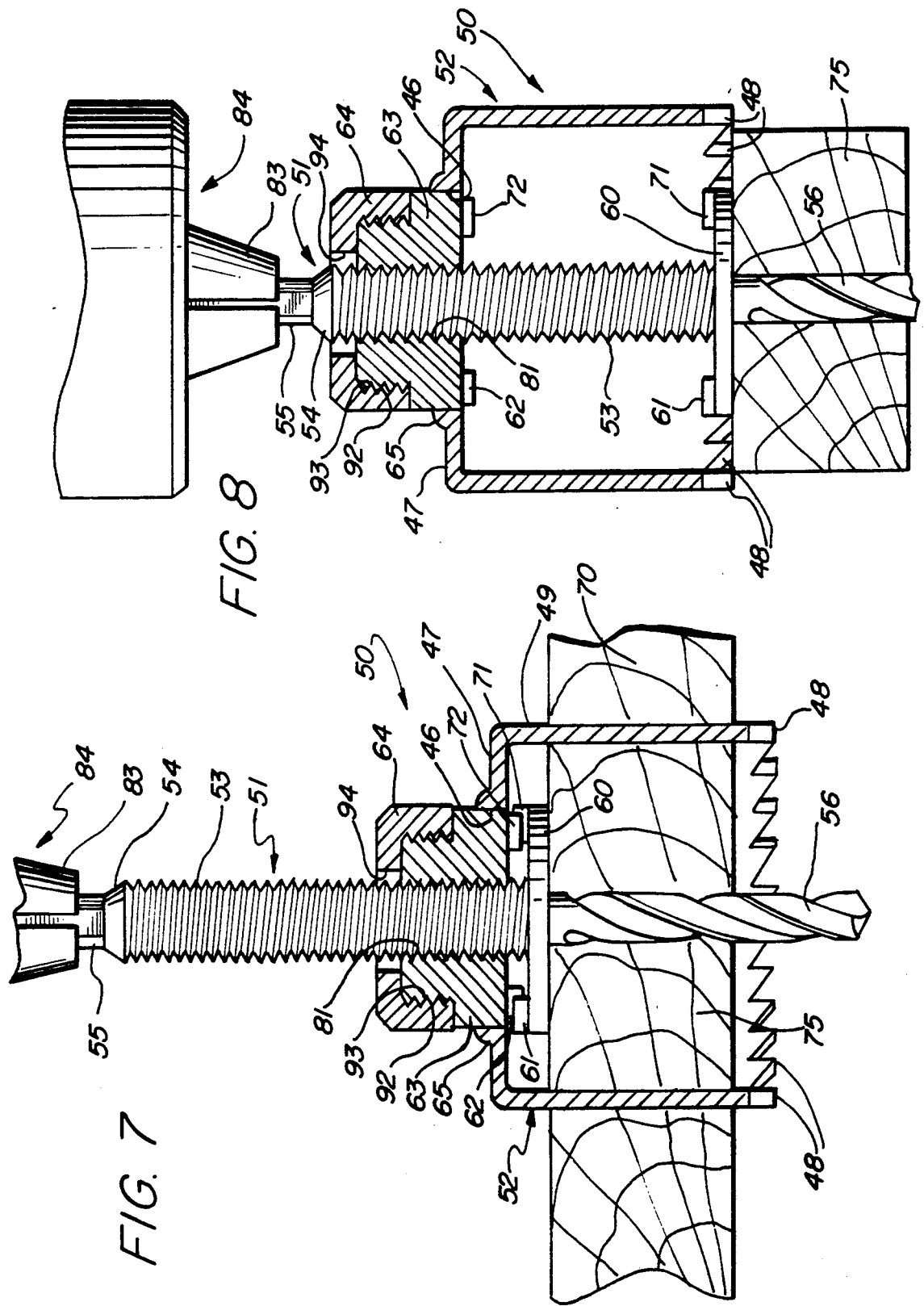

HOLE SAW AND DRIVE

CROSS REFERENCE TO RELATED PATENT APPLICATION

This application is a continuation-in-part of a copending application Ser. No. 06/855,949 filed Apr. 25, 1986, in the name of the applicant of this application and entitled IMPROVED HOLE SAW and now U.S. Pat No. 4,741,651.

FIELD OF THE INVENTION

This invention is related generally to hole saws having a common mandrel adapted to be used with different diameters of hole saws and more particularly, to hole saws having means to more easily remove the plug of material jammed into the interior of a hole saw after the saw has cut the hole.

BACKGROUND OF THE INVENTION

Various diameter hole saws that utilize a single-pilot, drill—containing mandrel—the mandrel being switched from one size to another size hole saw—are well known in the art.

For example, a typical hole saw consists of a cylindrical saw that forms a heavy base end with a threaded axially aligned hole in the bore. A threaded mandrel is adapted to screw into the base of the hole saw from the outside or base end of the saw. The mandrel at its threaded end forms a hole to accept the shank of a drill, the opposite end of the mandrel forming a shank designed to be received by the chuck of a drill motor or the like. Intermediate the threaded end and the shank of the mandrel is a flange formed typically in a round or hex-nut shape for securing the mandrel in the base of the hole saw. A slotted screw on the flange secures the shank of the pilot drill positioned in the hole formed in the threaded end of the mandrel.

A right-hand thread is normally used to secure the mandrel and the hole saw. In use then, when the serrated end of the saw contacts the surface of the material to be sawn, a reactive force between the hole saw and the mandrel tightens the mandrel against the saw allowing it to cut. After the saw cuts the hole, the plug of material then must be removed from the interior of the hole saw. Slots are normally formed by the hole saw body so that the plug may be pried out of the saw, a tedious task at best.

Another well known hole saw utilizes a slightly different configuration. The single mandrel for the various diameter hole saws consists of a mandrel body having a first flanged base end and a second, smaller—diameter, threaded end—the mandrel further forming an axially aligned hole therethrough adapted to accept a drill bit. The shank of the drill bit has flats to accept a slotted screw retained in the mandrel flange to secure the drill in the mandrel. The shank end of the drill is used to secure the hole saw in a drill motor as heretofore described. The flange of the mandrel is stepped down in diameter, forming a circular shoulder at its base, the intermediate flange being formed with flats that conform to complimentary flats formed in the base of the hole saw. The drill-containing mandrel then is inserted through the open serrated end of the hole saw, the intermediate flange flats being aligned with the flats of the hole saw to prevent rotation of the mandrel with respect to the hole saw. A threaded nut then is slipped over the shank of the drill and tightened into the threaded end of the mandrel protruding through the base of the hole saw, thereby securing the hole saw between the mandrel and the nut.

Again, slight movement between the hole saw and the mandrel will easily loosen the nut when the cutting end of the hole saw contacts the surface to be cut.

To remove the plug of material from the interior of the hole saw, the hole saw must be removed from, for example, the power drill. The nut is then removed from the mandrel, followed by forcibly driving the mandrel and plug out of the open end of the hole saw.

As an alternative, holes formed in the circular side wall of the saw enable the plug of material to be pried or split out of the mandrel, as previously described.

Some state-of-the-art hole saws utilize a washer and spring arrangement internally of the hole saw to keep the saw round while cutting.

The prevent invention overcomes the obvious deficiencies of the foregoing prior art by providing a means to easily remove a plug of material from the interior of a hole saw. This is accomplished without utilizing knives or picks or complete dismantling of the apparatus of the hole saw.

SUMMARY OF THE INVENTION

It is a general object of the present invention to provide an improved hole saw and drive. It is a more particular object of the present invention to provide and improved hole saw and drive which easily removes a plug of material from the interior of a hole saw after cutting.

In accordance with the invention, there is provided a hole saw having an open-ended, circular, hole saw body that forms a first cutting end having teeth for cutting in a cutting direction and a second base end. Walls of the hole saw formed between the base and the cutting end of the body define an interior cavity and an axially aligned, threaded hole is formed in the second base end of the hole saw body. A mandrel defining a threaded portion, flange and pilot drill is inserted through the open cutting end of the hole saw body. The flange portion of the mandrel and the base portion of the hole saw body define cooperating drive members which couple rotational force from the mandrel to the hole saw body when the mandrel is rotated in the cutting. A plug of material jammed between the flange and the walls forming the interior of the hole saw after a hole is cut in the material is removed from the interior by threading the mandrel out of the threaded base of the hole saw by rotation of the mandrel opposite to the cutting direction to drive the plug from the hole saw body.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a partially cut away view of a hole saw cutting part way through a material, the shank of the mandrel of the hole saw being retained within the chuck of a drill motor;

FIG. 2 is a partial cross-section of the hole saw with the flange of the threaded mandrel tightened against the base of the hole saw, a plug of sawn material being wedged within the interior of the hole saw;

FIG. 3 is a view taken through 3—3 of FIG. 1, looking down on the base end of the hole saw;

FIG. 4 is a partially sectioned hole saw, the threaded mandrel of which is backed away from the base of the hole saw, thereby forcing the jammed sawn material in the interior of the hole saw out of the saw;

FIG. 5 is a partially sectioned view of an alternate embodiment of the present invention;

FIG. 6 is a perspective view of the embodiment of FIG. 5 coupled to a power drill;

FIG. 7 is a section view of the embodiment of FIG. 5 taken along section lines 7—7 in FIG. 5; and FIG. 8 is a section view of the embodiment of FIG. 5 taken along section lines 7—7 showing the mandrel in the extended position driving a plug from the saw interior.

DESCRIPTION OF THE PREFERRED EMBODIMENTS

With reference to FIGS. 1, 2 and 3, the hole saw, generally designated as 10, consists of hole saw body 12, serrated cutting end 14, and base 16. Threaded to hole saw body 12 is a threaded mandrel, generally designated as 18, which forms a shank 20 adapted to be received by a chuck 11 of, for example, a power drill or drill press (not shown). The shank transitions into an enlarged segment having wrench flats 22 formed therein, the purpose of which will be explained further on into the specification. The mandrel 18 then forms an elongated threaded shaft 27 that threads into complimentary threads 21 in base 16. The elongated shaft 27 terminates at a flange 24 that is an integral part of the mandrel 18. The flange 24 forms an inside redially disposed shoulder 26 which in turn defines an upwardly extending tab 37. Correspondingly, hole saw body 12 defines an interior surface 23 which defines a downwardly extending tab 38 which cooperates with tab 37 to couple rotational power from mandrel 18 to saw body 12.

The flange 24 further forms an axially oriented hole 30 adapted to receive the shank of a drill bit 32. Typically, the drill bit is one-quarter inch in diameter. The shank is held in place within hole 30 by at least one set screw 36 radially disposed in flange 24 of mandrel 18.

The threads 27 and 21 formed in mandrel 18 and base 16 are preferably left-hand threads. The number of threads per inch of the shank and base is selected to advance tabs 37 and 38 from engagment as shown in FIG. 2 to nonengagement or clearance in a single rotation of mandrel 18.

By using left-hand threads on the assembly of the mandrel 18 to the hole saw body 12, clockwise rotation of a hand power drill (a standard rotation of all hand power drills and drill presses) causes tabs 37 and 38 to engage as shown in FIG. 2 which couples rotational power to saw body 12 as cutting end 14 contacts the surface of the material 15 to be cut.

After the material 15 is cut (FIG. 1), the plug 19 (FIG. 2) becomes wedged or jammed between the inside wall surface 25 of body 12, the radical outside shoulder 28 of flange 24, and the surface of the fluted pilot drill 32.

With reference now to FIGS. 3 and 4, to remove the plug of material 19 from the saw body 12, for example, the flats 17 of base 16 and flats 22 adjacent shank 20 are engaged with a pair of wrenches (not shown) to initially break the tightened flange 24 from base 16. The drill motor then may subsequently be reversed while holding the loosened saw body 12 from rotation by one of the wrenches, thereby locking the mandrel 18 out of base 16 and forcing the plug 19 from the interior of the saw 12. The threaded shank 27 is of a sufficient length to completely remove a plug of material from the interior of the hole saw 12 while the end of the shank 27 is still engaged with threaded bore 21.

In accordance with an important aspect of the present invention and with simultaneous reference to FIGS. 2 and 4, it should be noted that rotation of mandrel 18 in the clockwise direction causes mandrel 18 to be advanced with respect to saw body 12 upwardly toward the position shown in FIG. 2 due to the left-hand threads 27 on mandrel 18 and threads 21 within saw body 12. As mandrel 18 reaches the fully raised position shown in FIG. 2, tabs 37 and 38 are brought into engagement. Once tabs 37 and 38 are in contact or engagement, further clockwise rotation of mandrel 18 by power device 11 causes a corresponding rotation of saw body 12. In further accordance with the invention, the clockwise rotation of mandrel 18 and saw body 12 is in the cutting direction of teeth 14. Thus, as the present invention hole saw is driven in the clockwise direction and carries forward the above-described operation, the power from power device 11 is imparted to cutting teeth 14 through tabs 37 and 38.

Conversely, once the cutting function is complete and the direction of rotation of mandrel 18 is reversed, the cooperating left-hand threads 27 and 21 cause tabs 37 and 38 to be brought out of engagement and power is no longer coupled between saw body 12 and arbor 18. As mandrel 18 rotates in the counterclockwise direction, it advances downwardly with respect to saw body 12. In accordance with an important aspect of the present invention, the pitch of threads 27 and 21 are selected such that tabs 37 and 38 do not engage but clear each other on the first rotation of mandrel 18 in the counterclockwise direction from the engaged position shown in FIG. 2. Thereafter, the continued counterclockwise rotation of mandrel 18 drives mandrel 18 downwardly with respect to saw body 12 and drives plug 19 from the saw body. The hole saw then assumes the position shown in FIG. 4. Once plug 19 is removed from pilot drill 32, the clockwise rotation of mandrel 18 advances mandrel 18 upwardly within saw body 12 to the position shown in FIG. 2 where tabs 37 and 38 once again are engaged.

Therefore, in accordance with an important aspect of the present invention, tabs 37 and 38 form a unidirectional drive interlock between mandrel 18 and saw body 12 which permits mandrel 18 to be freely rotatable with respect to the saw body in the direction expelling the plug. Thus, the cutting torque coupled by arbor 18 to saw body 12 is not coupled through threads 27 and 21 which avoids any binding between arbor 18 and saw body 12 which might otherwise arise where the threads are used to coupled the cutting force to the saw.

In certain instances, it has been found that plug 19 may be formed after cutting materials such as plastic or the like having a capability to deform within saw body 12 and bind rather firmly therein. As a result, it is often necessary to engage a wrench or suitable tool to facets 17 of saw body 12 during the plug expelling operation. Because of the tendency found in users to inadvertently neglect to reverse the power drive during the plug expelling operation, it has been found preferable to secure facets 17 to base 16 by a separately threadable member 35. Accordingly, in accordance with an important aspect of the present invention, base 16 defines a threaded extension 40 which receives a threaded safety nut 35 having interior threads 41 to form the assembly shown in FIG. 1. Threads 40 and 41 are right-hand threads such that the forces imparted by counterclockwise rotation of mandrel 18 while facets 17 are held in a wrench or similar tool cause nut 35 to be tightened against base 16. This accommodates the above-described plug removal process. If, however, the user inadvertently fails to reverse the power drive from its clockwise rotation position while securing a wrench to facets 17, the clockwise rotation of mandrel 18 causes nut 35 to be threaded away from base 16 and out of engagement with hole saw 12. As a result, nut 35 simply spins freely from base 16 and thus no dangerous torque is applied to the wrench securing nut 35. The process of securing nut 35 with a suitable wrench is shown more clearly in FIG. 5 and is discussed in greater detail therein.

It should be noted that the embodiment set forth in FIGS. 1 through 4 of the present invention use a single tab on the saw body and mandrel flange. However, in certain hole saw configurations and uses, particularly those operating on hole saws of larger diameter, it has been found desirable to employ a plurality of tab pairs to provide a more symmetrical engagement and distribute the power coupling between the flange and the saw body. FIGS. 5 through 8 set forth an alternate embodiment of the present invention which employs a pair of oppositely spaced tab pairs to provide a more symmetrical drive in combination with a larger diameter hole saw.

FIG. 5 sets forth a partially sectioned view of the present invention hole saw and drive generally referenced by numeral 50. An elongated mandrel 51 includes a threaded portion 53 having a left-hand in accordance with the present invention, a tapered portion 54 and a faceted drive coupling 55. Mandrel 51 further includes an outwardly extending flange 60 and a pilot drill 56. Flange 60 in turn defines a pair of upwardly extending tabs 61 and 71 (the latter seen in FIG. 7). A saw body 52 includes a cup-like saw portion 49 defining a plurality of cutting teeth 48 and a base portion 47. Base 47 defines an aperture 46. A threaded collar 63, the details of which are set forth below in greater detail but which should be understood to include an internal aperture supporting a plurality of left-hand threads, extends through aperture 46 in base 47 and is secured thereto by a weld junction 65. A safety nut 64 is, by means set forth below in greater detail, threadably received upon threaded collar 63. Threaded collar 63 further defines a pair of downwardly extending tabs 62 and 72 (the latter seen in FIG. 7).

In the position shown, arbor 51 is received within saw body 52 by the threaded cooperation of threads 53 on mandrel 51 and threads 81 on threaded collar 63 (seen in FIG. 7). It should be noted that the left-hand threads of threads 53 and 81 draw mandrel 51 upwardly within saw body 52 during clockwise rotation of arbor 51. In accordance with the present invention, the upward rotation of arbor 51 causes tabs 61 and 71 to abut tabs 62 and 72 of threaded collar 63. With tabs 61 and 71 in contact with tabs 62 and 72 respectively, the continued clockwise rotation of arbor 51 transfers the rotational force upon arbor 51 to saw body 52 by the engagement of tabs 61, 62, 71 and 72. The clockwise rotation of saw body 52 and arbor 51 causes pilot drill 56 to drill into wooden board 70 and bring cutting teeth 48 into contact with board 70. Thereafter, and as described above, the continued rotation of arbor 51 and saw body 52 causes a cylindrical plug to be cut from board 70 as shown in FIG. 7. In accordance with an important aspect of the present invention, it should be noted that the power coupling between arbor 51 and saw body 52 is carried by tabs 61, 62, 71 and 72 rather than threads 53 and 81.

FIG. 6 sets forth a perspective view of the present invention hole saw and drive following the completion of a cutting operation in which a plug 75 has been cut from board 70 and is supported upon pilot drill 56. FIG. 6 shows the removal process for expelling plug 75 from the interior of saw body 52. Accordingly, a power drill 84 having a reversible capability in accordance with conventional power drill fabrication techniques includes a chuck 83 which engages faceted portion 55 of arbor 51 just beyond tapered portion 54. In accordance with conventional fabrication techniques, drill 84 provides rotational power to arbor 51 in either clockwise or counterclockwise directions. An open end wrench 80 having a spanner portion 82 is received upon safety nut 64 and is maintained in a fixed position by the user's hand (not shown). With the saw configured as shown in FIG. 6, drill 84 is operated in the reverse direction causing arbor 51 to be rotated in the direction shown by arrow 90. The rotation of arbor 51 in the direction indicated by arrow 90 is carried forward while wrench 80 is securely held thereby holding saw body 52 and causing arbor 51 to be threadably driven downward with respect to saw body 52 which in turn drives plug 75 outwardly from the interior of saw body 52. Once plug 75 has cleared the perimeter of cutting teeth 48, it is removed manually from pilot drill 56 completing the plug removal operation. Following removal of plug 75, the direction of drill 84 is again reversed causing mandrel 51 to be rotated in the direction indicated by arrow 91 which draws arbor 51 upwardly with respect to saw body 52 until tabs 61 and 62 and 71 and 72 once again engage and hole saw assumes the cutting position shown in FIG. 5. It should be noted that once plug 75 is removed from pilot drill 56, open end wrench 80 is removed from threaded nut 64 prior to reversing drill 84 and returning the hole saw to the cutting position shown in FIG. 5.

FIG. 7 sets forth a section view of the present invention hole saw and drive taken along section lines 7—7 in FIG. 5. As mentioned above, hole saw 50 is shown in FIG. 7 at the completion of the cutting operation in which a plug 75 has been cut from board 70. A saw body 49 defines a plurality of cutting teeth 48 and a base portion 47. Base 47 further defines an aperture 46 which receives a threaded collar 63. Threaded collar 63 is secured to base 47 by a weld junction 65. Alternatively, collar 63 and base 47 could be formed in a one-piece construction. Threaded collar 63 defines an internal threaded passage 81 and an externally threaded portion 92. A threaded nut 64 defines a plurality of internal threads 93 which cooperate with threads 92 to secure threaded nut 64 upon threaded collar 63. Threaded nut 64 further defines a clearance aperture 94. Threaded collar 63 further defines a pair of downwardly extending tabs 62 and 72 positioned on opposite sides of threaded aperture 81. Mandrel 51 includes a left-hand threaded portion 53, a tapered portion 54 for strength and ease of alignment, and a faceted portion 55. The latter is received within chuck 83 of power drill 84 in accordance with conventional operational techniques. Arbor 51 further includes an outwardly extending flange 60 and a pilot drill 56. Flange 60 defines a pair of upwardly extending tabs 61 and 71 positioned on opposite sides of threaded portion 53.

In the position shown, tab 61 engages tabs 62 and tab 71 engages tab 72 such that clockwise rotation of arbor 51 by power drill 84 causes the rotational power to be coupled from arbor 51 to saw 52 by the engagement of tabs 61, 62, 71 and 72. As set forth above, threads 81 and 53 are left-hand threads which assures that rotation of arbor 51 in the clockwise direction maintains the engagement of tabs 61, 62, 71 and 72 during the cutting operation.

FIG. 8 sets forth the present invention hole saw and drive 50 in section view taken along section lines 7—7 in FIG. 5 following the completion of the plug expelling operation. Accordingly, following the cutting operation shown in FIG. 7, power drill 84 is reversed causing arbor 51 to be rotated in the counterclockwise direction as described above in connection with FIG. 6. As set forth above, the counterclockwise rotation of arbor 51 causes arbor 51 to be driven downwardly with respect to hole saw 52 due to the left-hand threads 81 and 53. It should be noted that the pitch of threads 81 and 53 is selected such that tabs 61 and 71 of flange 60 are advanced downwardly with respect to tabs 62 and 72 during the first half turn of arbor 51 to a sufficient distance that tab 61 clears tab 72 and tab 71 clears tab 62. Thereafter, the continued counterclockwise rotation of arbor 51 drives arbor 51 downwardly through threaded collar 63 and hole saw 52 causing plug 75 to be driven from the interior of hole saw 52 and beyond teeth 48. With the present invention hole saw and drive in the configuration shown in FIG. 8, plug 75 is removed from pilot drill 56 after which power drill 84 is reversed and a clockwise rotation of arbor 51 causes arbor 51 to be drawn upwardly within saw body 52 to reassume the position shown in FIG. 7 in preparation for the next cutting operation. As mentioned in connection with FIG. 6, a wrench is secured to threaded nut 64 during the plug expelling operation. In the event plug 75 binds within saw body 49 as arbor 51 is rotated in the counterclockwise direction to expel the plug, a resisting force is created against saw 52 which is resisted through the use of a wrench secured to safety nut 64. Because threads 92 and 93 are right-hand threads, this resisting force serves to further tighten nut 64 upon threaded coupler 63 and thus permits the wrench to securely hold hole saw 52 while the plug is expelled from the hole saw. In the event the user inadvertently attempts to rotate arbor 51 in the clockwise direction due to a failure to reverse drill 84, the resulting torque applied to nut 64 serves to thread nut 64 from threaded coupler 63 and permits saw body 52 to turn without imposing a significant torque upon the wrench applied to nut 64. Thus, injury to the user is avoided as nut 64 is simply and harmlessly spun off of threaded coupler 63.

It should be apparent to those skilled in the art that while the present invention hole saw and drive employs one or more tab members to provide the unidirectional drive coupling between the arbor and the hole saw, other unidirectional drives may be employed without departing from the spirit and scope of the present invention. Similarly, it should be understood that different tab structures may be utilized and different numbers of tab sets may be employed in providing the unidirectional drive function of the present invention hole saw and drive without departing from the spirit and scope of the present invention.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A hole saw comprising:
   a saw body having a base end defining a threaded aperture therein, a side wall extending from said base end and defining an interior cavity and an outer edge, and a plurality of cutting teeth formed on said outer edge and configured to cut in a first direction of saw body rotation;
   a mandrel having a first end configured to be coupled to a source of rotational power, a second end supporting an outwardly extending flange and a pilot drill, and a threaded portion therebetween,
   said threaded portion of said mandrel being threadably received within said threaded aperture such that said flange is received within said interior cavity and such that rotation of said mandrel with respect to said saw body in said first direction of rotation advances said flange toward said base end and rotation of said mandrel in a second direction opposite to said first direction advances said flange away from said base end; and
   one-way drive means coupling said flange to said base end when said mandrel is rotated in said first direction.

2. A hole saw as set forth in claim 1 wherein said threaded aperture and said threaded portion of said mandrel are left-hand threads.

3. A hole saw as set forth in claim 2 wherein said one-way drive means include a first tab extending from said flange toward said base end and a second tab extending from said base end toward said flange, said first and second tabs abutting to couple rotational power from said mandrel to said saw body.

4. A hole saw as set forth in claim 3 further including a third tab extending from said flange toward said base end and positioned opposite said first tab and a fourth tab extending from said base end and positioned opposite from said third tab, said third and fourth tabs also abutting to couple rotational power from said mandrel to said saw body.

5. A hole saw as set forth in claim 4 wherein said base end includes a threaded end concentric with said threaded aperture and a safety nut having a threaded recess for receiving said threaded end of said base end, said threaded end and said threaded recess define right hand threads.

6. For use in combination with a mandrel having a left-hand threaded portion, a power coupling end, a flange having first and third extending tabs and a pilot drill, a hole saw comprising:
   a saw body having a side wall, a closed base end defining a left-hand threaded aperture and second and fourth extending tabs, and a plurality of cutting teeth, said saw body further including a right-hand threaded collar extending from said base end and a safety nut, having a threaded aperture, threadably received upon said threaded collar.

7. A hole saw comprising:
a cupped saw body having a cylindrical side wall, a closed base end, and a cutting edge, said base end and said side wall forming an interior cavity;
a threaded collar joined to said base end having a left-hand threaded passage and a first pair of drive tabs extending into said interior cavity;
a mandrel having a drive end, a left-hand threaded portion, a flange having a second pair of drive tabs and a pilot drill,
said mandrel threadably received within left-hand said threaded passage and said pairs of drive tabs cooperating to couple rotational power from said mandrel to said saw body.

* * * * *